(12) United States Patent
Choi

(10) Patent No.: US 7,097,684 B2
(45) Date of Patent: Aug. 29, 2006

(54) METHOD OF FORMING COMBINED PLEATED SCRIM AND FILTER MEDIA MATERIALS AND PRODUCT OF SAME

(75) Inventor: Kyung-Ju Choi, Jefferson County, KY (US)

(73) Assignee: AAF-McQuay, Inc., Louisville, KY (US)

( * ) Notice: Subject to any disclaimer, the term of this patent is extended or adjusted under 35 U.S.C. 154(b) by 269 days.

(21) Appl. No.: 10/317,437

(22) Filed: Dec. 12, 2002

(65) Prior Publication Data

US 2004/0112023 A1    Jun. 17, 2004

(51) Int. Cl.
*B01D 39/16* (2006.01)
*B01D 46/52* (2006.01)

(52) U.S. Cl. ............................ 55/486; 55/487; 55/499; 55/500; 55/521; 55/527; 55/528; 55/DIG. 5; 210/493.5; 156/60; 156/73.1; 156/206; 156/207; 156/327; 264/5; 264/6; 264/13; 264/171.1; 264/171.13; 264/286; 264/DIG. 48

(58) Field of Classification Search ................. 55/486, 55/487, 499, 500, 521, 527, 528, DIG. 5, 55/497, 524; 210/493.1, 493.5; 156/60, 156/73.1, 205, 206, 207, 211, 327; 264/5, 264/6, 12, 13, 171.1, 171.13, 286, DIG. 48
See application file for complete search history.

(56) References Cited

U.S. PATENT DOCUMENTS

| | | | |
|---|---|---|---|
| 4,917,942 A * | 4/1990 | Winters | 55/486 |
| 5,071,555 A | 12/1991 | Enbom | 210/493.5 |
| 5,089,202 A * | 2/1992 | Lippold | 55/521 |
| 5,290,447 A * | 3/1994 | Lippold | 210/493.1 |
| 5,306,321 A | 4/1994 | Osendorf | 55/487 |
| 5,427,597 A * | 6/1995 | Osendorf | 55/487 |
| 5,725,812 A | 3/1998 | Choi | 264/6 |
| 5,804,014 A | 9/1998 | Kähler | 156/204 |
| 5,891,482 A | 4/1999 | Choi | 425/72.2 |
| 5,968,373 A | 10/1999 | Choi | 210/806 |
| 5,976,209 A | 11/1999 | Choi | 55/482 |
| 5,976,427 A | 11/1999 | Choi | 264/6 |
| 6,146,436 A * | 11/2000 | Hollingsworth et al. | 55/486 |
| 6,159,318 A | 12/2000 | Choi | 156/167 |
| 6,165,241 A * | 12/2000 | Choi | 55/521 |
| 6,165,242 A * | 12/2000 | Choi | 55/524 |
| 6,254,653 B1 | 7/2001 | Choi et al. | 55/497 |
| 6,398,839 B1 | 6/2002 | Choi et al. | 55/499 |
| 6,579,350 B1* | 6/2003 | Doherty | 55/521 |
| 2002/0073667 A1* | 6/2002 | Barris et al. | 55/486 |

OTHER PUBLICATIONS

LMS Technologies, Inc, Report # 362 Aug. 1, 2002.
LMS Technologies, Inc. Report # 384 Oct. 22, 2002.
ANSI/ASHRAE Standard 52.2—1999.

* cited by examiner

*Primary Examiner*—Duane Smith
*Assistant Examiner*—Jason M. Greene
(74) *Attorney, Agent, or Firm*—Steve A. Witters; Middleton Reutlinger

(57) ABSTRACT

A high efficiency fluid filter arrangement wherein a combined layer of scrim and filter media applications is of empirically relatively estimated weight size and depth with intermediate pleat spacing so as to arrive at a combined filtration capability value in keeping with selected approved test standards.

70 Claims, 9 Drawing Sheets

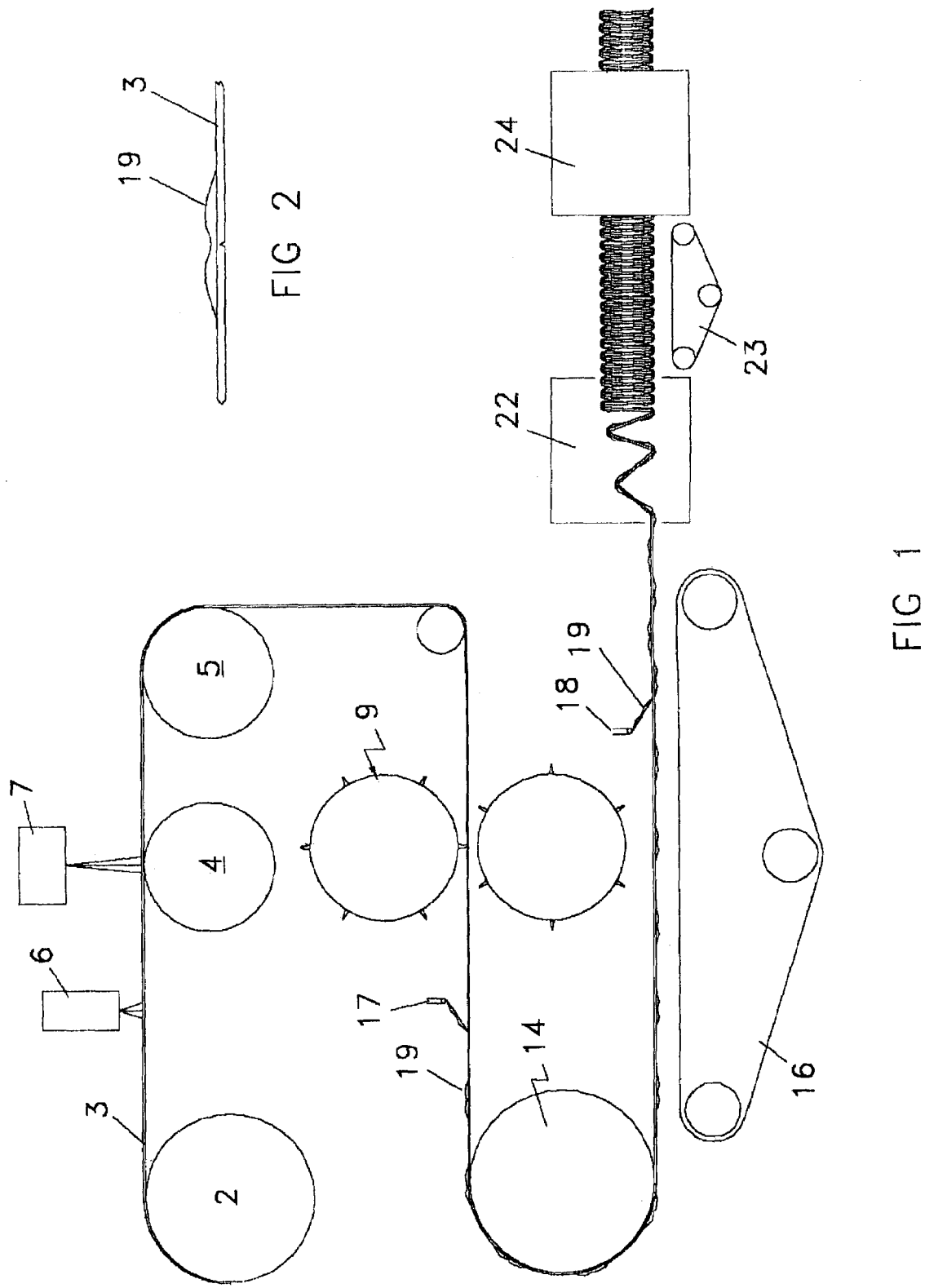

METHOD OF FORMING COMBINED PLEATED SCRIM AND FILTER MEDIA MATERIALS AND PRODUCT OF SAME

BACKGROUND OF THE INVENTION

The present invention relates to fluid filter media material and more particularly to a unique and novel arrangement for combining scrim and filter media materials of selected characteristics in a combined pleated arrangement capable of having a desired pressure drop with a minimum efficiency reporting value (MERV).

The present invention finds its background in the development of melt blown filter media materials and particularly in the inventive features set forth in several patents issued to Kyung-Ju Choi. Included among these several patents are: U.S. Pat. No. 5,725,812, issued Mar. 10, 1998, and U.S. Pat. No. 5,891,373, issued Apr. 6, 1999—both of which patents relate to melt blown fiber attenuating die structure; U.S. Pat. No. 5,968,373, issued Oct. 19, 1999, which patent relates to fiber layer positioning; U.S. Pat. No. 5,976,209, issued Nov. 2, 1999 and U.S. Pat. No. 5,976,427, also issued on Nov. 2, 1999, which patent relates to fiber spinning arrangements; and, U.S. Pat. No. 6,159,318, issued Dec. 12, 2000; U.S. Pat. No. 6,165,241, issued Dec. 26, 2000; U.S. Pat. No. 6,254,653, issued Jul. 3, 2001 and U.S. Pat. No. 6,398,839, issued Jun. 4, 2002—these last four patents relating to melt blown pleated filter arrangements, with particular attention being noted as to the pleat spacing arrangements of FIGS. 1, 5 and 11 of aforenoted U.S. Pat. No. 6,165,241. Attention further is directed to U.S. Pat. No. 5,306,321 and No. 5,427,597, both of which were issued to R. J. Osendorf on Apr. 26, 1994 and Jun. 27, 1995, respectively and which relate to pleated and dimpled filter media in cylindrical form.

In addition, attention also is directed to U.S. Pat. No. 5,071,555, issued on Dec. 10, 1991 to K. Enbom; U.S. Pat. No. 5,089,202, issued on Feb. 18, 1992 to H. J. Lippold; U.S. Pat. No. 5,290,447, issued Mar. 1, 1994 to H. J. Lippold; and U.S. Pat. No. 5,804,014, issued Sep. 8, 1998 to K. Kahler. These four patents teach comparatively complex filter media offset and spacer dispensed arrangements for spacing the pleats of such filter media.

Finally, attention is directed to Table 12-1 at page 26 of ANSI/ASHRAE Standard 52.2—1999, which sets forth Minimum Efficiency Reporting Value (MERV) parameters and to page 1 of the LMS Technologies, Inc., Bloomington, Minn. 55439 Test Reports—AHRAE Test Standard 52.2 showing the Test Results requested by Applicant's employer, AAF International, Louisville, Ky.

In accordance with the present invention, a unique, novel, straight-forward, efficient and economical method of pleating and spacing a combined scrim and filter medium and a unified product of the same is provided. The inventive method and related inventive product can be readily and inexpensively manufactured and assembled in a novel manner with a minimum of steps and a minimum of parts, effectively utilizing and inventively adding to the know-how of arrangements as set forth in the afore described and enumerated issued U.S. Patents.

As can be realized from the description set forth hereinafter, the present invention provides a novel and unique combined filter arrangement, including a novel method and unified product of making the same, the unique combined filter media product produced by the novel method steps obtaining a desired efficiency at a desired low pressure drop.

Various other features of the present invention will become obvious to one skilled in the art upon reading the disclosure set forth herein.

BRIEF SUMMARY OF THE INVENTION

More particularly the present invention provides a novel method of manufacturing a low pressure drop pleated fluid filter media including an upstream and downstream media face and being capable of obtaining a desirable minimum efficiency reporting value (MERV) comprising: feeding from a first supply zone to a forming zone at least one first layer of downstream support scrim, the support scrim layer being fibrous material of comparatively selected weight, fiber size and thickness; feeding from a second supply zone to the forming zone upon the scrim layer at least one upstream layer of filter media, the upstream filter media layer also being of a fibrous material of comparatively selected weight, fiber size and thickness with bonding between layers being accomplished without or with a minimum amount of bonding activity—depending upon the filter media density or mass per unit volume. In another feature of the present invention, the upstream filter application can be composed of very fine fibers with some loose ends and self adhering so that at least one upstream additional scrim layer can be added to the upstream filter layer.

In still another feature of the present invention, any desired bonding between layers can be accomplished with a suitable ultrasonic technique.

In yet another feature of the present invention, the combined layers can be pleated into a plurality of longitudinally extending pleats which can be separated by spacer material in such a unique manner that the upstream crests of the pleats are of a selected narrow breadth so that the combined pleated filter arrangement obtains a desired minimum efficiency reporting value (MERV) with an appropriate minimal pressure drop.

Moreover, the present invention provides a unified high efficiency, low pressure drop pleated fluid filter media product including an upstream and downstream face and being capable of obtaining a desirable minimum efficiency reporting value (MERV) comprising: at least one layer of downstream support scrim of a first fibrous material of selected by relative estimation of weight, fiber size and thickness; and, at least one application of fibrous filter media material combined in facing relation on the support scrim, with the combined scrim and filter media layer being pleated into a plurality of longitudinally extending adjacent crested pleats of specified depth and specified spacing between pleats to provide upstream and downstream filter faces, the combined scrim and filter media layer also being selected by relative estimation of weight, fiber size and thickness, and the longitudinally extending pleats of the combined layer being separated by a series of inventively contoured narrow strips of spacer material of specified shape and thickness to determine spacing between pleats with the upstream pleat crests being of selected narrow breadth whereby the combined pleated filter arrangement obtains a desired minimum efficiency reporting value (MERV) at a desired pressure drop.

It is to be understood that various changes can be made by one skilled in the art in the several steps of the inventive method and the several parts of the unified inventive product as described herein without departing from the scope or spirit of the present invention. For example, although the noted patents as above set forth describe inventive melt blown fiber media techniques and melt blown fiber media products, it would be possible for one skilled in the art to utilize other fiber media producing techniques in practicing the unified novel arrangement as set forth herein.

BRIEF DESCRIPTION OF THE DRAWINGS

Referring to the drawings which schematically disclose several embodiments of the present invention:

FIG. 1 is a flow diagram schematically disclosing structure utilized in carrying out one embodiment of the several steps of the inventive method to produce the unified related inventive product;

FIGS. 2 and 2A set forth a portion of one embodiment of the inventive product, illustrating one type of uniquely contoured spacing arrangement for the successive pleats of a portion of the combined novel pleated fluid treating scrim and filter media layer;

DETAILED DESCRIPTION OF THE DRAWINGS

Figure 1A:
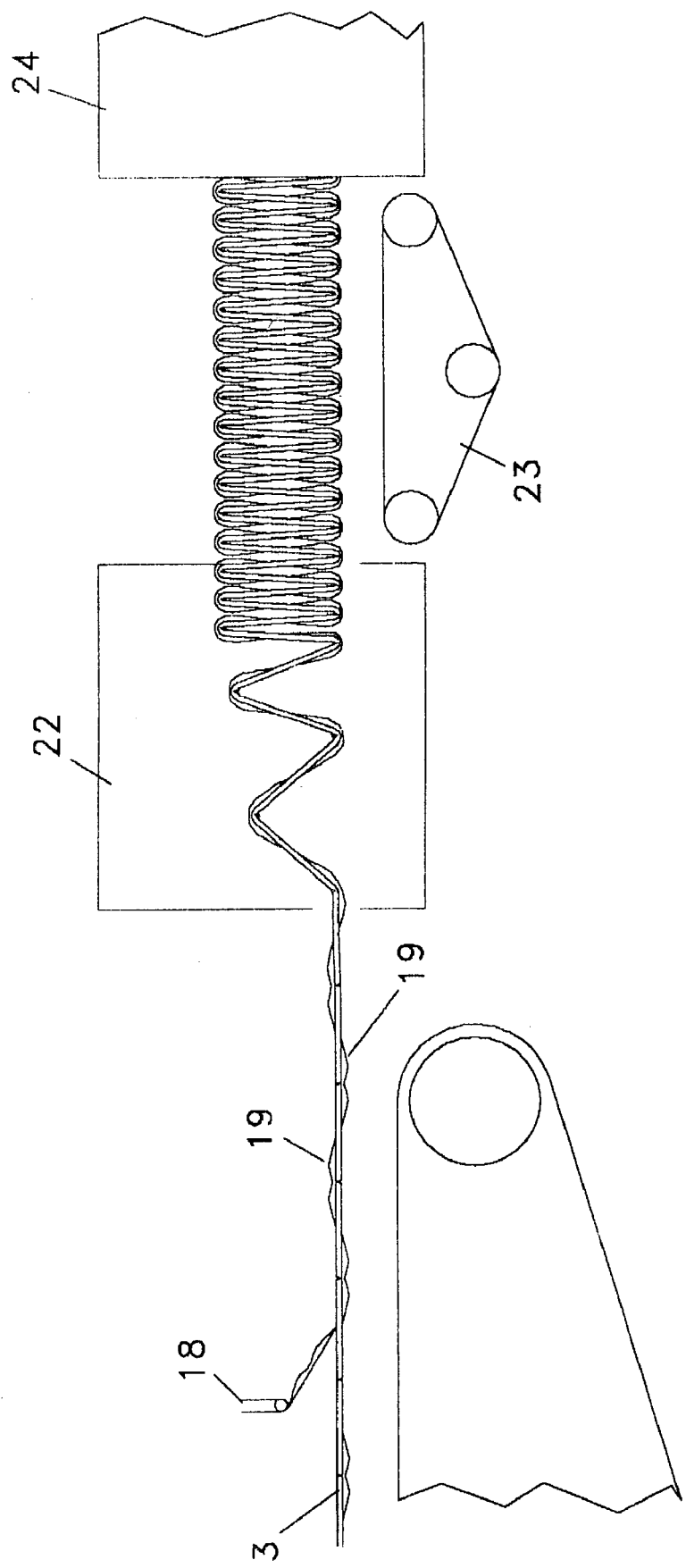
FIG. 1A is an enlarged portion of the flow diagram of FIG. 1.
Figure 2A:
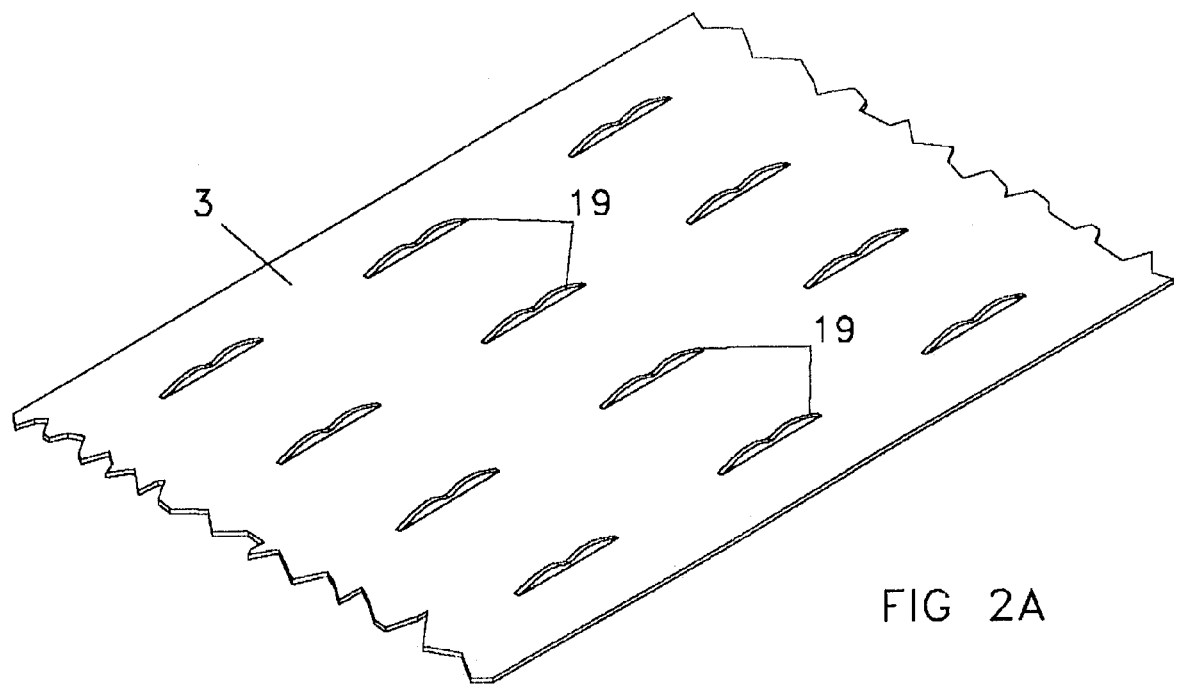
Figure 3:
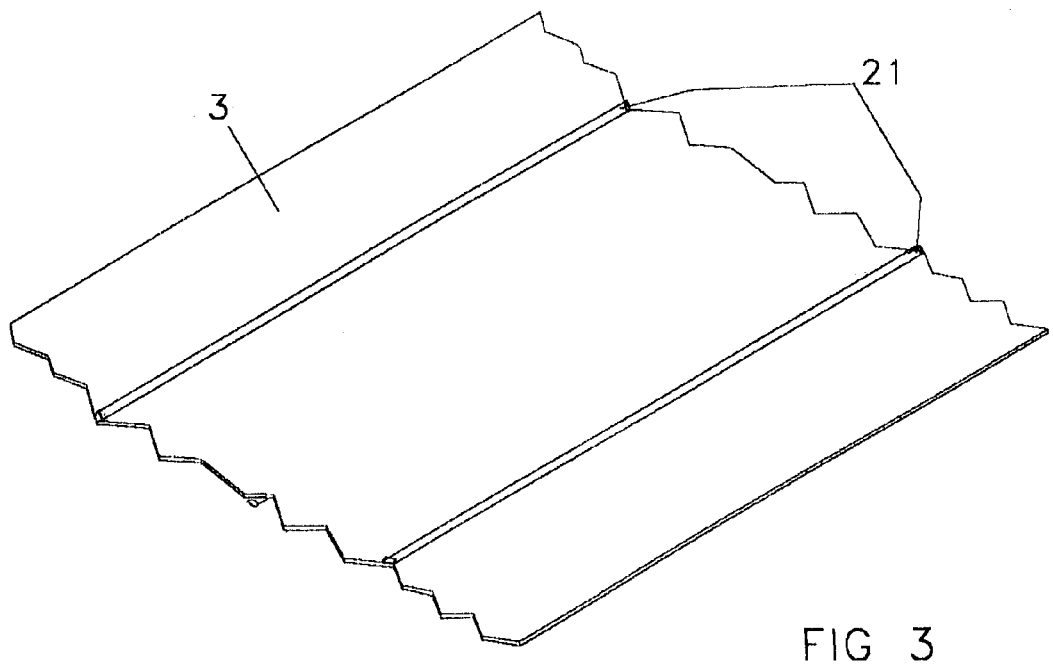
FIG. 3 sets forth a portion of another embodiment of the inventive product, illustrating another type of spacing arrangement for the successive pleats of the combined novel pleated fluid treating scrim and filter media layer.

Referring to FIGS. 1 and 1A of the drawings which discloses structure utilized to carry out one embodiment of the several steps of the inventive method to produce the novel high efficiency low pressure drop pleated fluid filter media—such as air filter media—a supply roll 2, which, if desirable, can be rotated by a suitable controllable motor (not shown) feeds from a supply zone a layer of comparatively selected scrim layer 3 to the anvil roll 4 which serves as a forming zone. The selected scrim layer 3 functions as a downstream support layer and, in accordance with one feature of the invention, advantageously can be a dri-laid or spun bond scrim material in the range of approximately forty (40) to one hundred fifty (150) grams per square meter and advantageously around sixty (60) grams per square meter (g./sq. m.) in basic weight with a fiber size of in the range of approximately seven (7) to one hundred (100) micrometers and advantageously around forty five (45) micrometers for the dri-laid and around twenty (20) micrometers in diameter for spun-bond and a Gurley stiffness of in the range of thirty (30) to five hundred (500) grams and advantageously around eighty (80) grams.

As the downstream support scrim layer 3 moves to anvil roll 4 in the forming zone, to spaced, aligned turning guide roll 5, it is minimally treated by spray mechanism 6 with a hot melt spray of adhesive amorphous material. In one advantageous embodiment of the present invention the hot melt spray can selectively be a plastomer material such as polyethylenevinylacetate.

After the scrim material is appropriately minimally hot-melt sprayed in a manner as above described, an application of fine melt blown polypropylene filter media material of a relatively estimated selected weight, fiber size, thickness and porosity is applied in the forming zone 4 from a spinning source 7 to the hot melt sprayed downstream scrim support layer 3. It is to be understood that the spinning source 7 can advantageously be in accordance with any one or more of the melt blown patented processes heretofore identified in the specification and therefore not described in detail herein.

Once the selected fine fiber material has been appropriately deposited on the hot melt sprayed support scrim 3, the combined scrim and filter media layer 3 is passed along from the forming zone over spaced, aligned turning guide roller 5 to a scoring zone 9 in order to make sharp scores on combined scrim and filter media layer 3 for pleating purposes by providing a series of spaced rows of spaced aligned scores which extend laterally or transversely across the combined scrim and filter media layer 3. The spacing of these rows of lateral, transversely spaced scores is selected to determine the depth of the subsequently formed pleats.

Advantageously, in one embodiment of the invention the pleats can be of a depth of approximately three quarters (3/4) inch.

It also is to be understood that advantageously the formed scores are empirically or by relative estimation selectively and inventively of very small size to insure that the longitudinally extending upstream crests of subsequently formed pleats are desirably sharp and narrow in breadth so as to afford a minimum of crest resistance to a treated fluid stream. In this regard, the peak sharpness advantageously can be in the range of zero point zero one (0.01) to zero point two (0.2) inches, and, advantageously, the breadth of the crests can be less than zero point zero five (0.05) inches, depending upon the thickness of combined scrim and filter media layer 3.

From the scoring zone which includes opposed roller, scoring mechanism 9, the combined scrim and filter media layer 3 is passed along to spacer application zone 17 to turning guide roller 14 and over endless belt conveyor 16. It is to be noted that the guide rollers 5 and 14 are so spaced and positioned that both faces of combined scrim and filter media layer 3 can be accessible to spacer treatment by pleat spacer applicators 17 and 18.

The high efficiency fluid filter material of the combined scrim and filter media layer 3 has a desired minimum efficiency reporting value (MERV) of at least twelve (12) under ASHRAE standard 52.2—1999 at a minimum fluid flow pressure drop of approximately zero point two (0.2) inches of water gage at a fluid flow rate of approximately three hundred (300) feet per minute (ft/min.). The combined scrim and filter media layer 3 is capable of capturing at least eighty (80) percent (%) or more of particle sizes in the range of one (1) to three (3) microns and at least (90) percent (%) of particle sizes in the range of three (3) to ten (10) microns in a treated fluid stream moving at approximately three hundred (300) feet per minute (ft/min) for residential application and at approximately five hundred (500) feet per minute (ft/min) for commercial and industrial applications.

Referring to FIGS. 2, 2A, 3 and 4 and to above-noted U.S. Pat. No. 6,165,241, issued to Kyung-Ju Choi, on Dec. 26, 2000, the pleat spacers in the spacer treating zone can be of varied form—FIGS. 2, 2A and 4 disclosing spaced lateral rows of inventively cross-sectional bow shaped short spacer strips 19 spacer strips 19 extending in spaced longitudinal alignment along combined scrim and filter media layer 3 and FIG. 3 disclosing laterally spaced longitudinally extending spacer strips 21 on combined scrim and filter media layer 3. As in aforenoted U.S. Pat. No. 6,165,291, short spacers 19 and continuous longitudinally extending spacers 21 can be formed from any one of a member of known suitable fluid pliable adhesives which can be inserted in afore described spacer applicators 17 and 18.

As in the aforenoted patent, the strips can be formed from thermo-bondable plastic materials which can incorporate a small percentage by weight of calcium carbonate, clay, phosphate derivatives or halogenic derivatives to enhance flame retardancy and reduce costs with spacing in the range of one (1) to four (4) inches. The thickness of the applied spacer materials in accordance with one feature of the present invention can be carefully selected so as to optimize pleat spacing and fluid resistance. In one advantageous embodiment of the present invention with pleat depth of three quarters (¾) inches, the adhesive spacers can have an optimum thickness of approximately zero point one (0.1) inches. It is to be noted that the cross-sectional bow shape is narrowest at the middle area where it is arranged to engage the sharp pleat crest so as to thus optimize pleat spacing and fluid resistance. Advantageously, the peak sharpness can be in the range of zero point zero one (0.01) to zero point two (0.2) inches.

Again referring to FIGS. 1 and 1A of the drawings, once either short cross-sectionally bow shaped spacer strips 19 or continuous spaced longitudinally extending strips 21 are applied to the combined scrim and filter media layer 3, the layer is passed by endless conveyor 16 to a pleating zone including a pleating mechanism 22 and then by endless conveyor 23 to a final cutting and assembly station (not shown).

Figure 4:
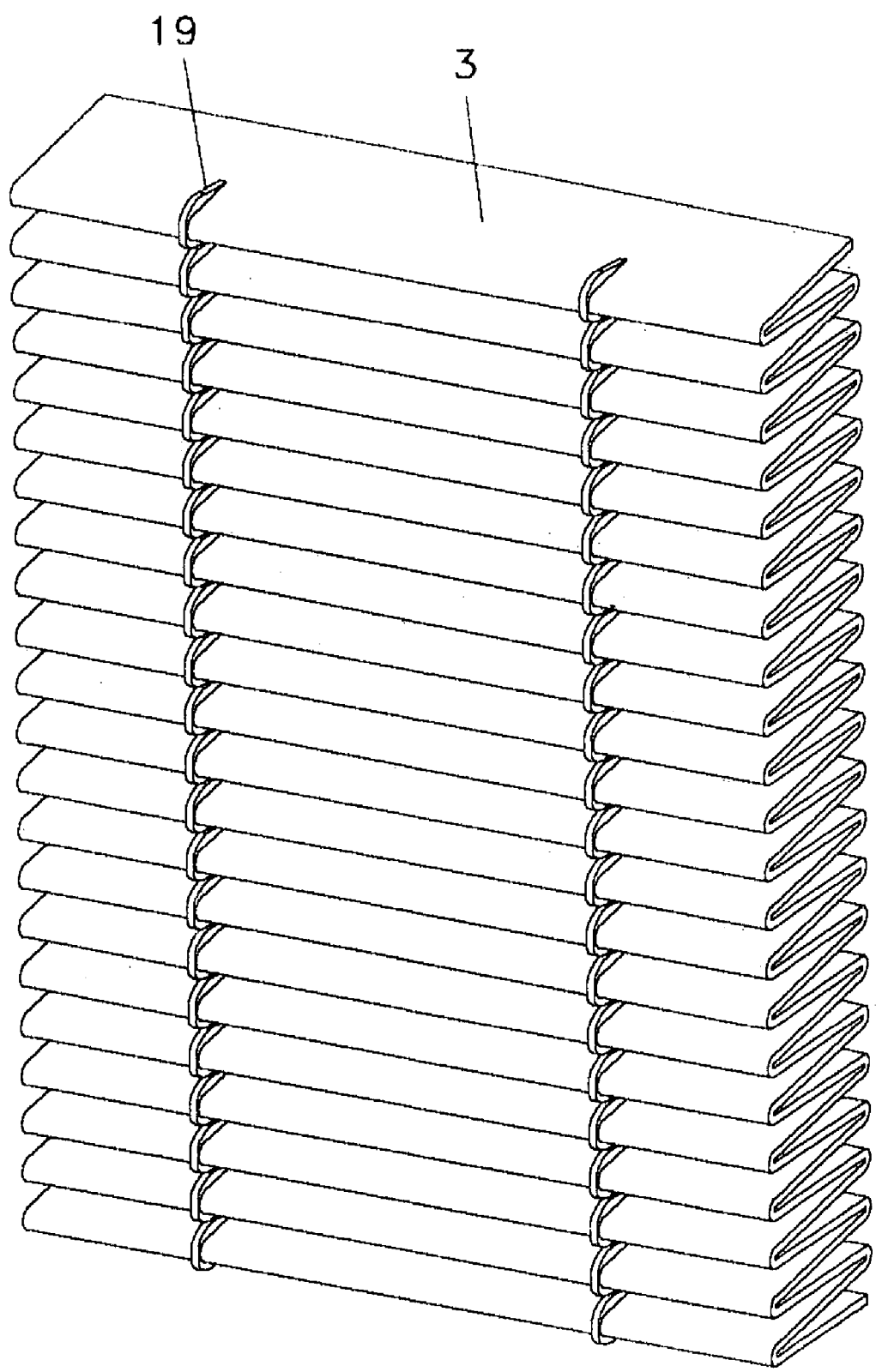
FIG. 4 sets forth an isometric illustration of a portion of the pleat spacing embodiment of FIGS. 2 and 2A.
Figure 4A:
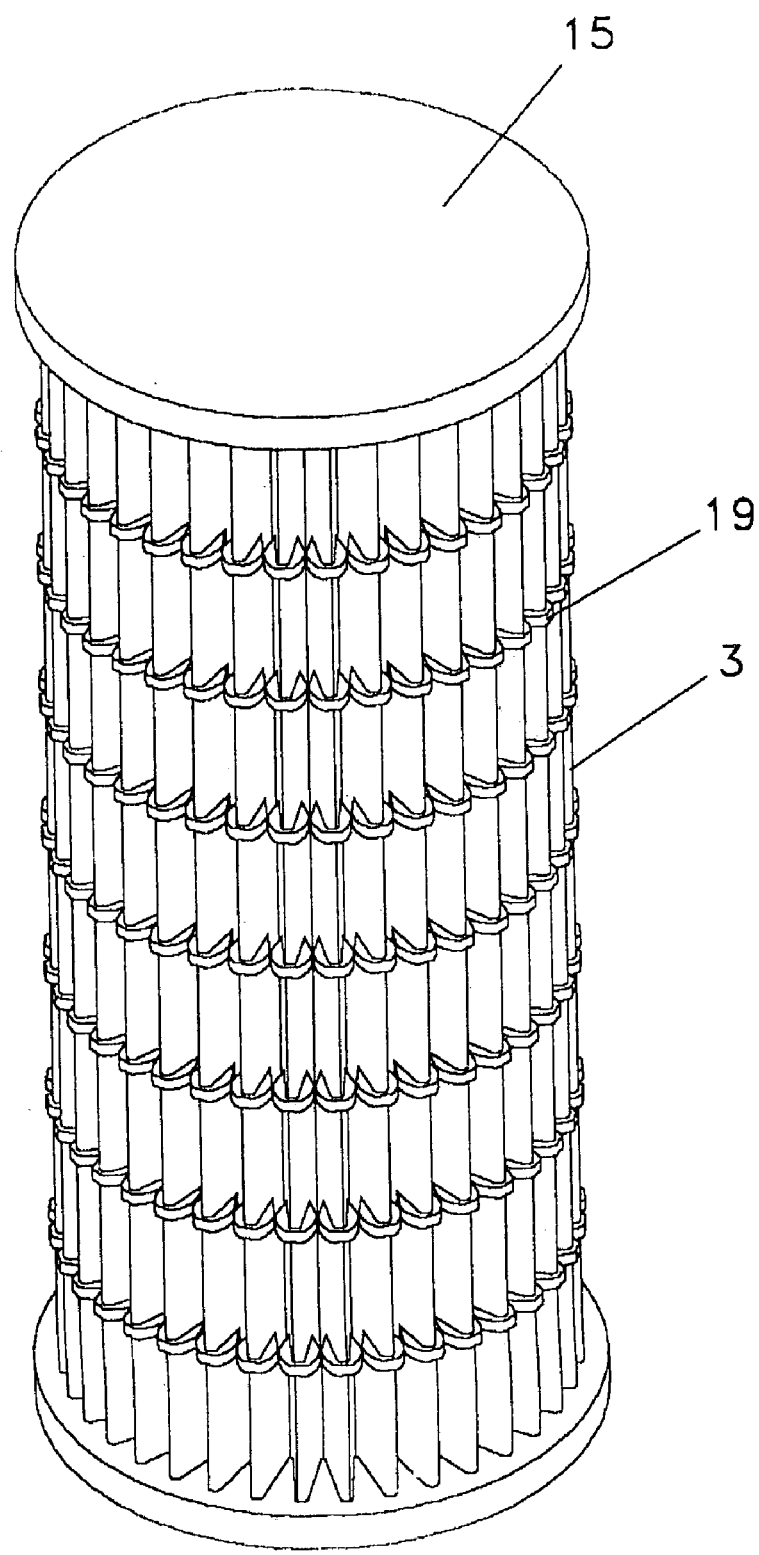
FIG. 4A is an isometric illustration of a cylindrical embodiment incorporating the inventive product.

Referring to FIG. 4A of the drawings, it can be seen that a support scrim 3 of cellulosic material embodying the features of the present invention can be used in a cylindrical type filter application 15 with a typical basic weight being approximately one hundred (100) grams per square meter (g/sq. m.).

Figure 5:
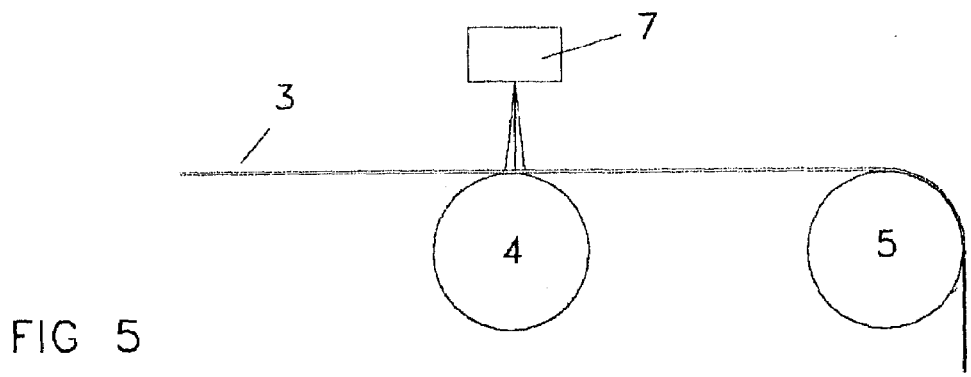
FIGS. 5–12 are flow diagrams schematically disclosing portions of combined scrim and filter media layer forming structures which can be used in carrying out several different embodiments of the inventive method to produce different embodiments of the related inventive product.

Referring to FIG. 5 of the drawings, it can be seen that it is not always advantageous to apply adhesive on the support scrim 3 when the fibers are fine and the basic weight of the melt blown filter media is lighter than eight (8) grams per square meter (g/sq. m.).

Figure 6:
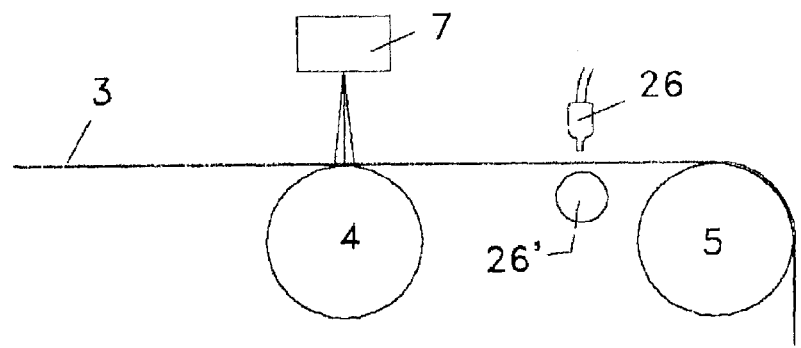

Referring to FIG. 6 of the drawings, there is schematically disclose in another embodiment of the present invention, a modified upstream forming zone portion of the structure which can be used in the present invention. In place of the hot melt spray mechanism 6 of FIGS. 1 and 1A, an ultrasonic horn 26 and anvil 26' are disclosed positioned above the upper part of combined scrim and filter media layer 3 in spaced relation downstream from the melt blown spinning source 7. It is to be understood that the ultrasonic horn 26 can have a frequency in the range of five (5) to sixty (60) kilohertz (kHz) and advantageously twenty (20) kilohertz, serving to heat and adhesively bind the combined scrim and filter media layer 3 before the same is passed to the other zones disclosed in FIGS. 1 and 1A.

Figure 7:
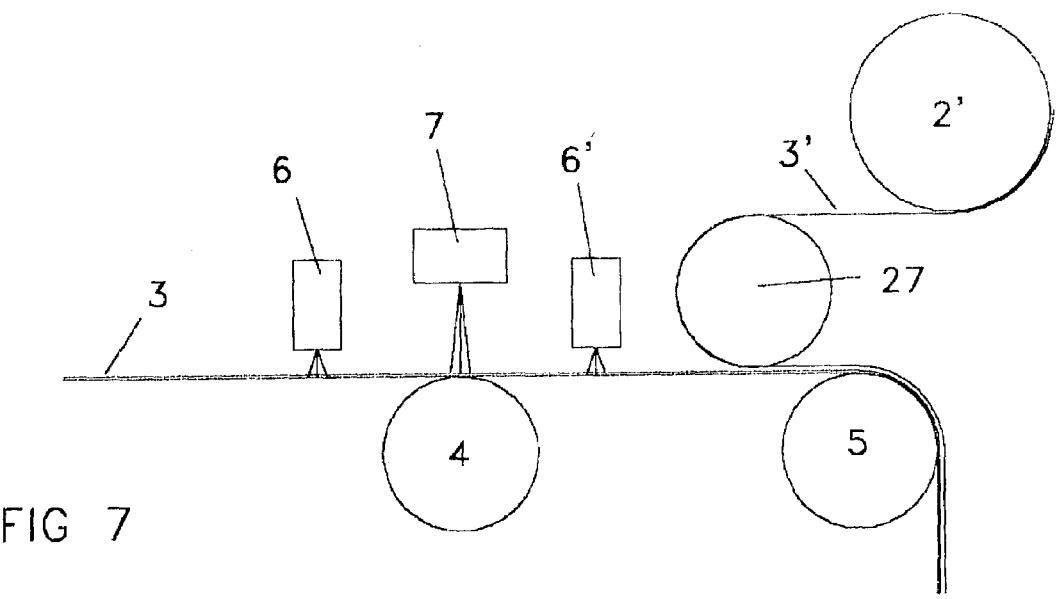

In FIG. 7, another forming zone embodiment of the upstream structure is disclosed. When the upstream melt blown layer is composed of very fine fibers with some loose ends, at least one upstream scrim is added on top of this layer. In this novel arrangement, a second hot melt spray 6' is positioned in spaced relation downstream melt blown spinning arrangement 7 and an upper scrim layer 3' is added from scrim supply source 2', feeding scrim 3' over idle roller 27 before it engages the combined filter media and scrim layer 3. It is to be understood that scrim 3' can be a synthetic spun bond scrim in the range by weight of approximately five (5) to forty (40) grams per square meter (g/sq. m.) of much lighter weight than the support scrim of the combined layer 3 and also is of selected by relative estimation or empirically of fiber size and thickness wherein the combined relatively selected layer 3 of both scrim materials and sandwiched filter media obtains a desired minimum efficiency reporting value (MERV) at a desired pressure drop. It also is to be understood that the upstream scrim layer 3' can be of a synthetic material such as a low melt polypropylene spun bond material of approximately fourteen (14) grams per square meter (g/sq. m.) as can the other combined filter media application from the melt blown source thus being sandwiched in faced relation between scrim layers 3 and 3'.

Advantageously, the high efficiency fluid filter material of the combined sandwiched layer 3 of FIG. 7, including the filter media application sandwiched between downstream and upstream scrim layers has a desired minimum efficiency reporting value (MERV) of at least twelve (12) under ASHRAE standard 52.2—1999 at a minimum fluid flow pressure drop of approximately zero point two (0.2) inches of water gage at a fluid flow rate of approximately three hundred (300) feet per minute (ft/min.). The combined scrim and sandwiched filter media layer is capable of capturing at least eighty (80) percent (%) or more of particle sizes in the range of one (1) to three (3) microns and at least (90) percent (%) of particle sizes in the range of three (3) to ten (10) microns in a treated fluid stream moving at approximately three hundred (300) feet per minute (ft/min) for residential application and at approximately five hundred (500) feet per minute (ft/min) for commercial and industrial applications.

The downstream support scrim of the combined scrims and filter media application layer of FIG. 7 can be a dri-laid or spun bond scrim material in the range of approximately forty (40) to one hundred fifty (150) grams per square meter and advantageously around sixty (60) grams per square meter (g/sq. m) in basic weight with a fiber size in the range of approximately seven (7) to one hundred (100) micrometers and advantageously around forty five (45) micrometers for the dri-laid and around twenty (20) micrometers in diameter for spun-bond and a Gurley stiffness in the range of thirty (30) to five hundred (500) grams and advantageously around eighty (80) grams.

The afore described sandwiched filter media of FIG. 7 can be a fine synthetic material such as a melt blown polypropylene and the upstream scrim can be a light weight synthetic spun bond scrim in the range by weight of approximately five (5) to forty (40) grams per square meter (g/sq. m) and advantageously a polypropylene spun bond scrim of approximately fourteen (14) grams per square meter (g/sq. m).

The hot melt spray from hot melt sprays 6 and 6' can be a synthetic hot melt adhesive such as a low melt polyethylene or a plastomer such as polyethylenevinylacetate.

Figure 8:
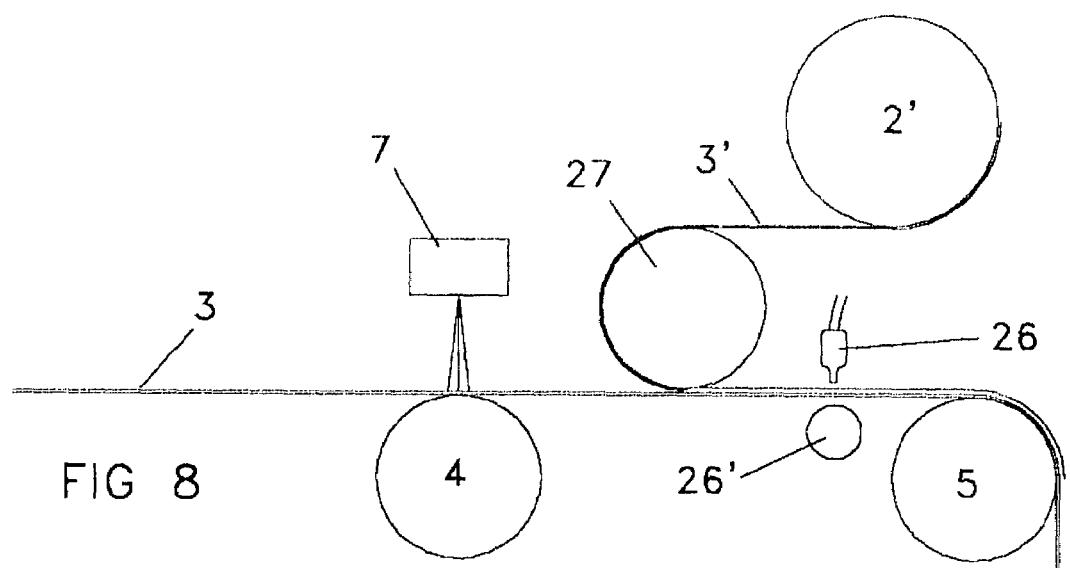

In FIG. 8, as above-noted in FIG. 6, the hot melt spray mechanism 6 can be replaced by an ultrasonic horn 26 and anvil 26' with a horn frequency of five (5) to sixty (60) kilohertz (kHz) and advantageously twenty (20) kilohertz to heat and adhesively bind the scrim and filter media layers. As can be seen, such an ultrasonic horn 26 and anvil 26' can be spacedly positioned downstream melt blown spinning mechanism spaced and scrim supply 2' and idle roller 27 which serves to add the third lighter scrim layer 3'.

In FIGS. 9–12, still further varied forming zone embodiments of the invention can be seen as positioned above the combined scrim and filter media layer 3.

Figure 9:
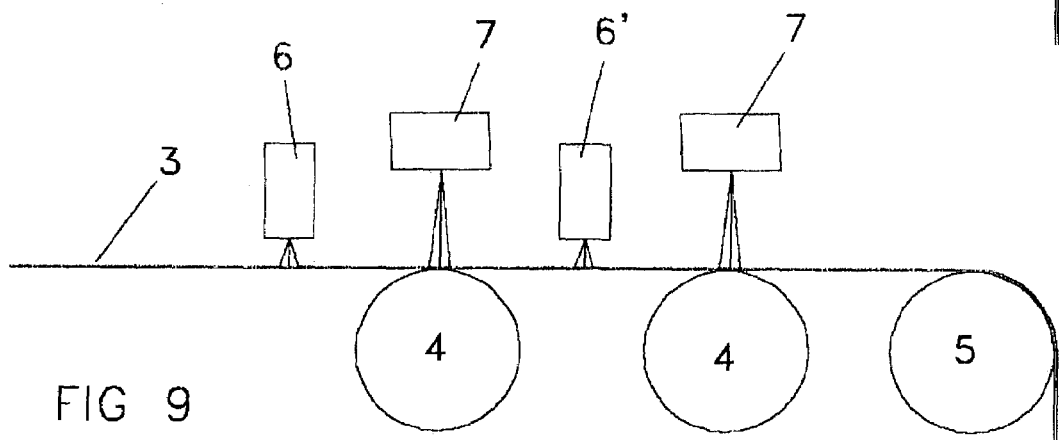

In FIG. 9, the forming zone embodiment disclosed includes hot melt sprays 6 and 6' and intermediate spaced melt blown spinning mechanism 7 and anvil 4 and a further second downstream spaced melt blown spinning mechanism 7 and anvil 4.

Figure 10:
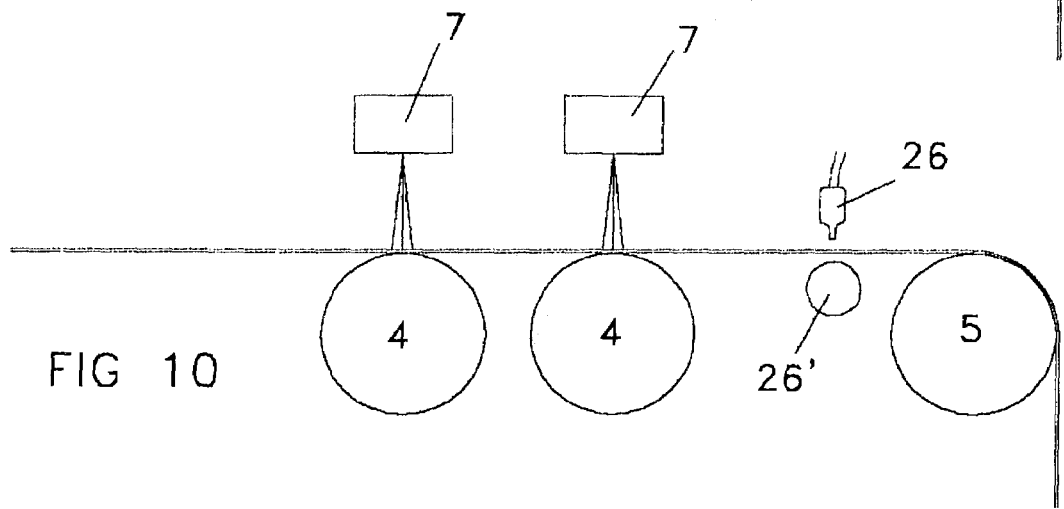

In FIG. 10, the forming zone includes two successively spaced melt blown spinning mechanisms 7 and anvil 4 above the scrim layer 3 which are followed by ultrasonic horn and anvil 26 and 26'.

Figure 11:
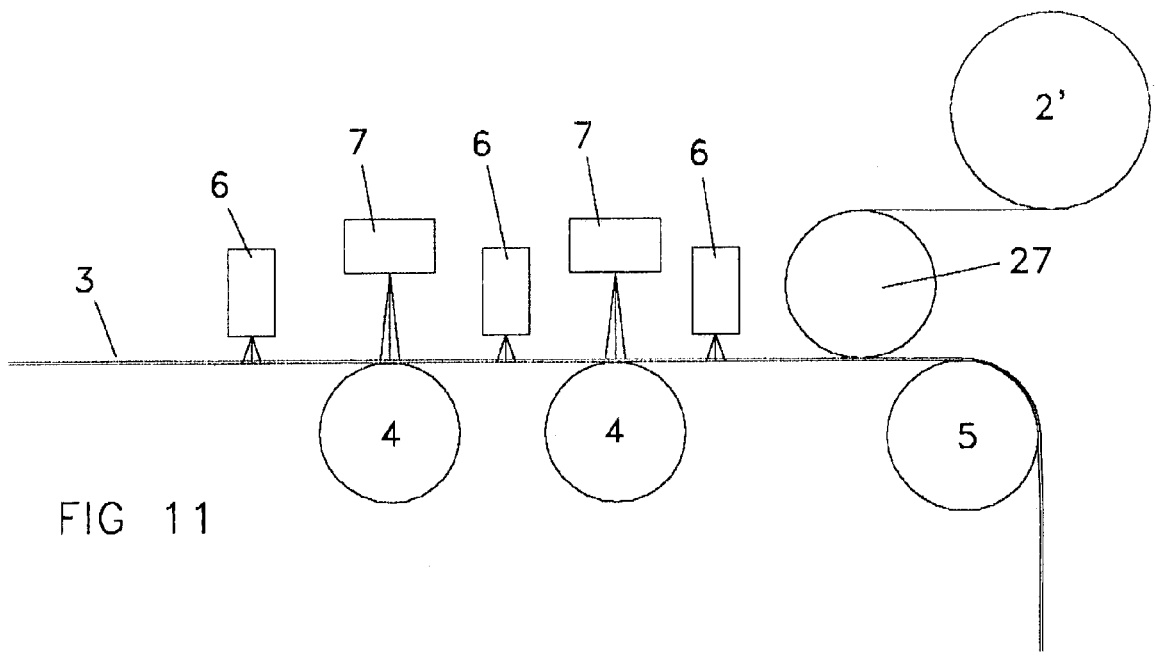

In FIG. 11, the forming zone includes three successively spaced hot melt sprays 6 with intermediate melt blown spinning mechanisms 7 and anvil 4. This arrangement is followed by a spaced light weight scrim third layer supply 2' and accompanying idle roller 27.

Figure 12:
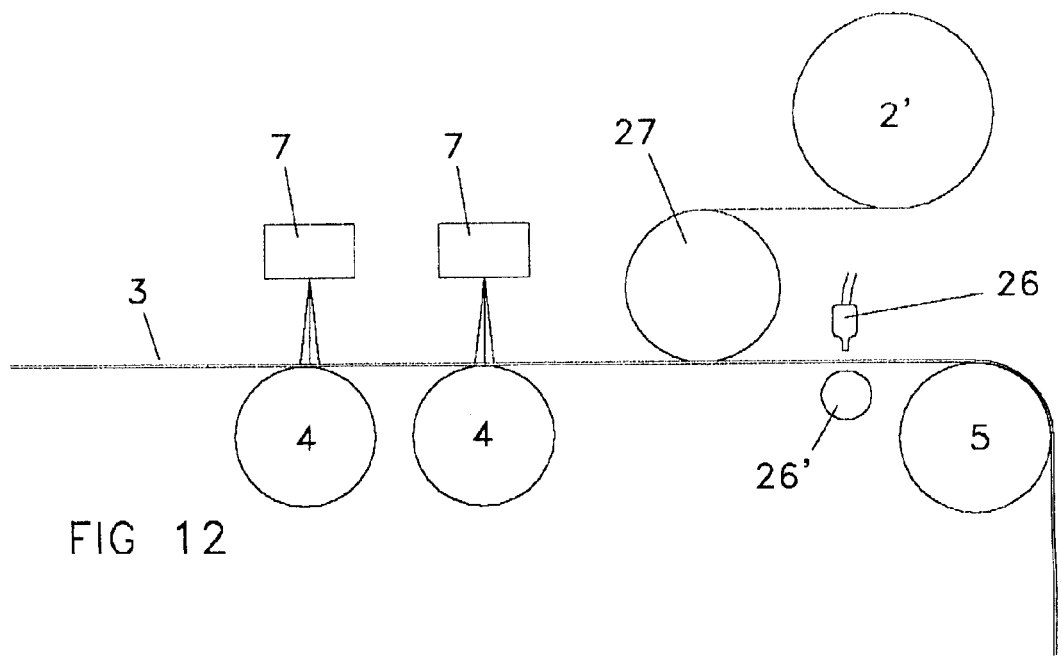

Finally, in FIG. 12, a still further forming embodiment of invention is disclosed which includes above the combined scrim and filter media layer 3, two spaced melt blown spinning mechanisms 7 and anvils 4 followed by a light weight scrim supply 2' and accompanying idle roller 27 followed by spaced ultrasonic horn 26 and anvil 26'.

Figure 13:
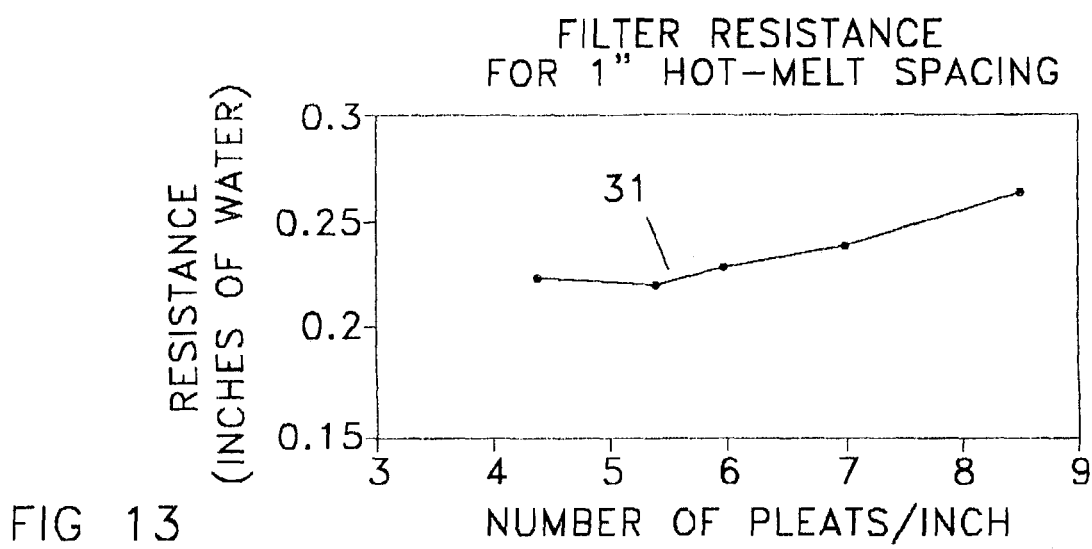
FIG. 13 discloses a plotted diagram for an inventive embodiment of a pleated combined scrim and filter media layer, the longitudinally extending pleats having a pleat depth of one (1) inch, the diagram plotting media resistance in inches of water (vertical) against the number of pleats per inch (horizontal) with the resistance increasing as the number of pleats per inch increases.

In FIG. 13, which vertically plots resistance in inches of water and horizontally in number of pleats per inch, curve 31 is disclosed sloping upwardly from left to right with the resistance increasing as the number of pleats per inch increases.

Figure 14:
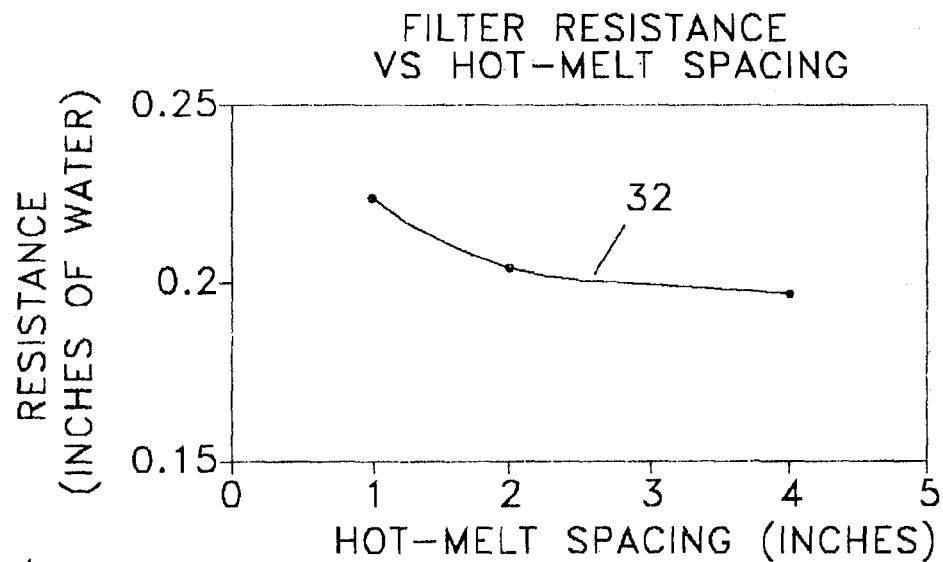
FIG. 14 discloses a similar plotted diagram for another inventive embodiment of a combined scrim and pleated filter media layer, the diagram again plotting filter resistance in inches of water (vertical) against hot-melt spacing between pleats in inches (horizontal) with the filter resistance decreasing as the spacing decreases; and, FIG. 15 discloses still another plotted diagram for an inventive embodiment of a pleated combined scrim and filter media layer, the diagram plotting filter efficiency of particles of one (1) to three (3) micrometers (vertical) against the number of pleats per inch (horizontal).

In FIG. 14, which vertically plots resistance in inches of water and horizontally, the hot melt spacing in inches, curve 32 is disclosed sloping downwardly from left to right with the resistance decreasing as the hot melt spacing decreases.

Figure 15:
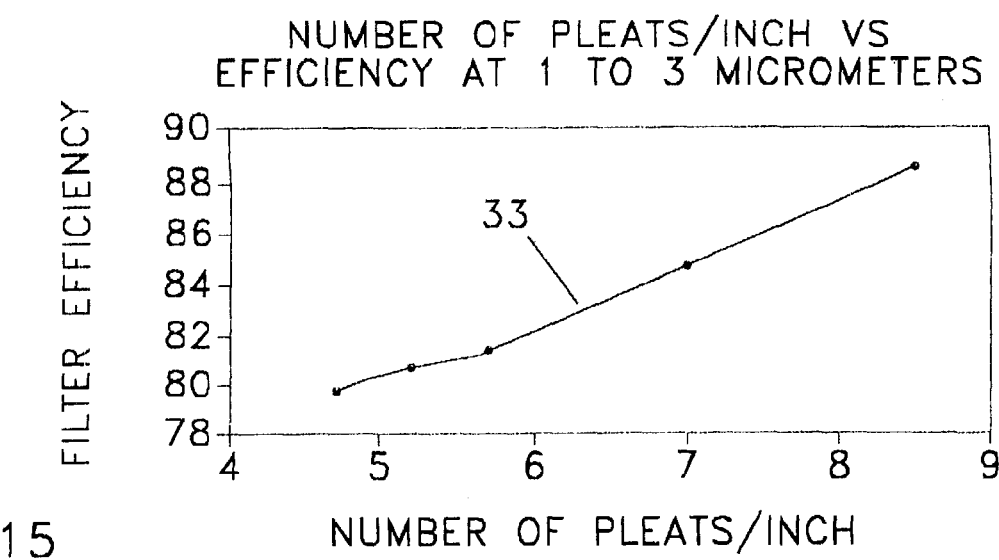

In FIG. 15, the filtration efficiency on a fluid stream moving at approximately three hundred (300) feet per minute (ft/m) with particle sizes of one (1) to three (3) microns is plotted against the number of pleats per inch with curve 33 sloping upwardly from left to right disclosing increased filter efficiency with increased number of pleats per inch.

In summary, the novel method includes the steps of feeding from a supply zone to a spaced filter media application zone at least one layer of support scrim material of empirically or relatively estimated and selected weight, fiber size and thickness; applying and combining at least one application of filter media on the support scrim, such filter media also being of empirically or relatively estimated selected weight, fiber size and thickness so as to obtain at least a combination of scrim and filter media of desired minimum efficiency reporting value (MERV) at a desired pressure drop.

In yet another feature of the inventive method, the combined layer of scrim and filter media application(s) can be moved to still another scrim applicator zone to apply a comparatively light weight scrim layer obtaining sandwiched filter media and scrim combination. Appropriate hot melt adhesive spraying zones or ultrasound treating zones can be utilized in forming two, three or even more filter media applications. Further steps can be included wherein the applied filter media is successively passed to a hot melt spacing zone; at least one spacer applicator zone and advantageously to two such spacer application zones to apply spacers in a spaced selected shaped segment or continuous longitudinally ribbon form on opposite faces of the combined scrim and filter media layer with the combined layer then being passed to a successive pleating zone 4.

In two test reports conducted by LMS Technologies, Inc. of Bloomington, Minn. 55439 (reports included with PTO Form 1449) with a test dust of ASHRAE 52.2 dust; a test aerosol of KCL neutralized; a particle analysis of Hiac/Royco FE80 and a temperature and humidity at 70° at 35%, an inventive layered filter media had the following test results:

Test Results 1 with Spun-bond Support Scrim

| | |
|---|---|
| Test Air Flow Rate (CFM)/Velocity (FPM) | 819 cfm/ 295 fpm |
| Initial Resistance (in. WG) | 0.196 |
| Final Resistance (in. WG) | 1.0 |
| Minimum Efficiency Rating Value (MERV) | MERV 12 @ 820 cfm |
| Minimum Average Efficiency 0.3 to 1.0 Microns (E1) | 52.2 |
| Minimum Average Efficiency 1.0 to 3.0 Microns (E2) | 81.4 |
| Minimum Average Efficiency 3.0 to 10.0 Microns (E3) | 96.6 |
| Dust Fed to Final Resistance (grams) | 17.2 grams |

Test Results 2 with Dri-laid Support Scrim

| | |
|---|---|
| Test Air Flow Rate (CFM)/Velocity (FPM) | 819 cfm/ 295 fpm |
| Initial Resistance (in. WG) | 0.183 |
| Final Resistance (in. WG) | 1.0 |
| Minimum Efficiency Rating Value (MERV) | MERV 12 @ 819 cfm |
| Minimum Average Efficiency 0.3 to 1.0 Microns (E1) | 61.1 |
| Minimum Average Efficiency 1.0 to 3.0 Microns (E2) | 86.9 |
| Minimum Average Efficiency 3.0 to 10.0 Microns (E3) | 97.8 |
| Dust Fed to Final Resistance (grams) | 13.0 grams |

What is claimed is:

1. A method of manufacturing a low pressure drop pleated fluid filter including upstream and downstream media faces and being capable of obtaining a desirable minimum efficiency reporting value (MERV) comprising: feeding from a first supply zone to a forming zone at least one first layer of downstream support scrim, said support scrim layer being a fibrous material selected by relative estimation of weight, fiber size and thickness; feeding from a second supply zone to said forming zone unto said scrim layer at least one application of filter media, said filter media application being of a fibrous material selected by relative estimation of weight, fiber size and thickness; adhering said filter media onto said support scrim by either spraying said support scrim with an adhesive, ultrasonically bonding said filter media to said support scrim, or applying self adhering fibrous material to said support scrim; feeding said combined layer of scrim and filter media to a scoring zone to make selected spaced sharp score lines; feeding said scored combined layer to a spacer application zone to selectively apply by relative estimation spacer material on said combined layer; and feeding said combined layer with spacer material thereon to a pleating zone to be pleated into a selected plurality of pleats separated by said spacer material with the upstream crests of said pleats being of optimal narrow breadth whereby the combined pleated filter arrangement obtains a desired minimum efficiency reporting value (MERV) with a minimal pressure drop.

2. The method of manufacturing the high efficiency fluid filter of claim 1, at least one of said first and second selected fibrous materials being of synthetic material.

3. The method of manufacturing the high efficiency fluid filter of claim 1, both of said first and said second selected fibrous materials being of synthetic material.

4. The method of manufacturing the high efficiency fluid filter of claim 1, and feeding from a third supply zone to said forming zone unto said combined scrim and filter media application layer an upstream scrim layer of a fibrous material of selected by relative estimation of light weight material of less weight than said first fibrous support scrim material and of fiber size and thickness wherein the combined relatively filter media application and both scrim materials obtain a desired minimum efficiency reporting value (MERV) at a desired pressure drop.

5. The method of manufacturing the high efficiency fluid filter of claim 4, said upstream scrim layer being a synthetic material.

6. The method of manufacturing the high efficiency fluid filter of claim 4, said first, second and third selected fed materials are being of synthetic material.

7. The method of manufacturing the high efficiency fluid filter of claim 4, said three combined selected fibrous materials being in facing relationship with said filter media application being sandwiched between said downstream and upstream layers of scrim material.

8. The method of manufacturing the efficiency fluid filter of claim 7, wherein the desired minimum efficiency reporting value (MERV) is of MERV twelve (12) under ASHRAE standard 52.2—1999 at a minimum fluid flow pressure drop of approximately zero point two (0.2) inches of water gage at a fluid flow rate of approximately three hundred (300) feet per minute (ft/mm).

9. The method of manufacturing the efficiency fluid filter of claim 8, wherein the combined layer is capable of capturing from a treated fluid at least eighty (80) percent (%) or more of particle sizes in the range of one (1) to three (3) microns and at least (90) percent (%) of particle sizes in the range of three (3) to ten (10) microns in a treated fluid stream moving at approximately three hundred (300) feet per minute (ft/min) for the residential application and at approximately five hundred (500) feet per minute (ft/min) for commercial and industrial applications.

10. The method of manufacturing the high efficiency fluid filter of claim 1, said support scrim layer being a synthetic material of approximately forty (40) to one hundred fifty (150) grams per square meter (g./sq. m.) in basic weight with a fiber size of approximately seven (7) to one hundred (100) micrometers diameter and a Gurley stiffness of approximately thirty (30) to five hundred (500) grams.

11. The method of manufacturing a high efficiency fluid filter of claim 10, said support scrim layer being a spun bond material of approximately sixty (60) grams per square meter (g./sq. m.) in basis weight with a fiber size of approximately twenty (20) micrometers in diameter and a Gurley stiffness of approximately eighty (80) grams.

12. The method of manufacturing a high efficiency fluid filter of claim 10, said support scrim layer being a dri-laid material of approximately sixty (60) grams per square meter (g./sq. in.) in basic weight with a fiber size of approximately forty five (45) micrometers in diameter and a Gurley stiffness of approximately eighty (80) grams.

13. The method of manufacturing a high efficiency fluid filter of claim 1, said filter media application being a fine synthetic material.

14. The method of manufacturing a high efficiency fluid filter of claim 13, said filter media application being a melt blown polypropylene.

15. The method of manufacturing a high efficiency fluid filter of claim 4, said lightweight upstream scrim layer being a synthetic spun bond scrim in the range by weight of approximately five (5) to forty (40) grams per square meter (g./sq. m.).

16. The method of manufacturing a high efficiency fluid filter of claim 4, said light weight upstream scrim layer being a polypropylene spun bond scrim of approximately fourteen (14) grams per square meter (g./sq. m.).

17. The method of manufacturing a high efficiency fluid filter of claim 1, said support scrim layer being sprayed with a synthetic hot melt adhesive.

18. The method of manufacturing a high efficiency fluid filter of claim 1, said support scrim layer being ultrasonically bonded.

19. The method of manufacturing a high efficiency fluid filter of claim 1, said support scrim layer being self adhering to support upstream filtration addition which is lighter than eight (8) grams per square meter in basic weight.

20. The method of manufacturing a high efficiency fluid filter of claim 17, said synthetic hot melt adhesive being a low melt polyethylene.

21. The method of manufacturing a high efficiency fluid filter of claim 17, said synthetic hot melt adhesive being polyethylenevinylacetate.

22. The method of manufacturing a high efficiency fluid filter of claim 1, said application of filter media material including a minimal amount of synthetic hot melt adhesive spray.

23. The method of manufacturing a high efficiency fluid filter of claim 22, said synthetic hot melt spray being a low melt polyethylene.

24. The method of manufacturing a high efficiency fluid filter of claim 22, said synthetic hot melt spray being polyethylenevinylacetate.

25. The method of manufacturing a high efficiency fluid filter of claim 1, and introducing an additional application of fibrous filter media material from a supply zone into said forming zone unto said initial application of fibrous filter media material.

26. The method of manufacturing a high efficiency fluid filter of claim 25, said additional application of fibrous filter media material being preceded and followed by spraying a synthetic hot melt material and, introducing from a supply zone an additional upstream layer of light weight scrim material unto said combined layer.

27. The method of manufacturing a high efficiency fluid filter of claim 26, said additional application of fibrous filter material also being of selected by relative estimation of weight, fiber size and thickness wherein the combined layer of filter media and scrim obtains a desired minimum efficiency reporting value (MERV) at a desired pressure drop.

28. The method of manufacturing a high efficiency fluid filter of claim 1, said spacer material being narrow strips of a synthetic plastic hot melt with spacing in the range of one to four inches between said narrow strips.

29. The method of manufacturing a high efficiency fluid filter of claim 1, said peak sharpness being in the range of zero point zero one (0.01) to zero point two (0.2) inches.

30. A method of manufacturing a high efficiency, low pressure drop pleated air filter including an upstream and downstream face and being capable of obtaining a desirable minimum efficiency reporting value (MERV) at a minimum fluid flow pressure drop comprising: feeding from a first supply zone to a forming zone, a downstream support scrim layer of material of a spun-bond material of approximately sixty (60) grams per square meter (g./sq. m.) in basic weight with a fiber size in the range of approximately twenty (20) micrometers diameter and a Gurley stiffness of approximately eighty (80) grams to approximately sixty (60) grams per square meter (g./sq. m.) in basic weight with a fiber size of approximately forty five (45) micrometers diameter and a Gurley stiffness of approximately eighty (80) grams; applying a hot melt spray of an amorphous application of fine melt blown polypropylene filter material; feeding from a supply zone unto said support scrim and filter media layers an additional comparatively light weight upstream scrim material of spun bond polypropylene in the range by weight of approximately five (5) to forty (40) grams per square meter (g./sq. m.), said combined layers of scrim and filter materials addition being selectively spaced in facing relationship with hot melt sprays of polyethylenevinylacetate therebetween; passing said combined layer to a spacer application zone to apply narrow strips of spacer material of a synthetic plastic hot melt with spacing advantageously being approximately one (1) to four (4) inches to provide crest peak sharpness advantageously less than zero point zero five (0.05) inches; and then passing said combined layer to a pleating zone to form pleats of a depth of zero point seventy five (0.75) inches in the range of approximately four (4) to eight (8) pleats per inch with the desired minimum efficiency reporting value (MERV) of said combined facing layers of said support scrim, said filter media being a minimum of MERV twelve (12) under ASHRAE Standard 52.2—1999 at a pressure drop of zero point two (0.2) inches plus at an air flow of approximately three hundred (300) feet per minute (ft/min.) so as to be capable of capturing from a treated air stream at least eighty (80) percent (%) or more of particle sizes in the range of one (1) to three (3) microns and at least ninety (90) percent (%) of particle sizes in the range of three (3) to ten (10) microns.

31. A high efficiency, low pressure drop pleated fluid filter including upstream and downstream laces and being capable of obtaining a desirable minimum efficiency reporting value (MERV) at the desired pressure drop comprising: at least one layer of downstream support scrim of a first fibrous material of selected by relative estimation of weight, fiber size and thickness; and, at least one application of a fibrous filter media material combined in facing relation on said support scrim layer, wherein said at least one application of a fibrous filter media material is accomplished by either spraying said support scrim with an adhesive, ultrasonically bonding said filter media to said support scrim, or applying self adhering fibrous material to said support scrim, with said combined scrim layer and filter media application being pleated into a plurality of longitudinally extending adjacent crested pleats of specified depth and specified spacing between pleats to provide upstream and downstream filter faces, said filter media application being of relatively estimated selected weight, fiber size and thickness, said longitudinally extending pleats of said combined support scrim and filter media layer being separated by a series of selectively spaced narrow strips of spacer material of specified thickness to determine spacing between pleats with the upstream pleat crests being of selected narrow breadth sharpness whereby the combined pleated filter arrangement obtains a desired minimum efficiency reporting value (MERV) at a desired pressure drop.

32. The high efficiency fluid filter of claim 31, at least one of said combined scrim and filter media application being of synthetic material.

33. The high efficiency fluid filter of claim 31, both said combined scrim and filter media application being of synthetic material.

34. The high efficiency fluid filter of claim 31, said spaced narrow strips of spacer material being spaced continuous longitudinally extending strips.

35. The high efficiency fluid filter of claim 31, said spacer narrow strips of spacer material being spaced short strips of bow-shaped cross-sectional contour so that the smaller volume of material of each strip engages along the crest of a pleat to provide said narrow breadth sharpness.

36. The high efficiency fluid filter of claim 31, and an upstream combined scrim of a fibrous selected material including a relatively estimated selected light weight material of less weight than said support scrim layer and of selected fiber size and thickness wherein the combined relatively selected scrim and filter media application layer has been so selected as to obtain a desired minimum efficiency reporting value (MERV) at a desired pressure drop.

37. The high efficiency fluid filter of claim 36, said upstream scrim being a synthetic material.

38. The high efficiency fluid filter of claim 36, said downstream scrim, fibrous filter media application and upstream scrim being of synthetic material.

39. The high efficiency fluid filter of claim 36, said combined upstream scrim being in immediate facing relationship with said fibrous filter media application which is thus sandwiched between said downstream and upstream scrim materials.

40. The high efficiency fluid filter of claim 39, wherein at least the minimum efficiency reporting value (MERV) is of MERV twelve (12) under ASHRAE standard 52.2—1999 at a fluid flow rate of approximately three hundred (300) feet per minute (ft/min.) and at a minimum pressure drop of approximately zero point two (0.2) inches.

41. The high efficiency fluid filter of claim 40, wherein the combined relatively estimated and selected filter media application and both upstream and downstream scrims are at least capable of capturing from a treated fluid stream at least eighty (80) percent (%) or more of particle sizes in the range of one (1) to three (3) microns and at least ninety (90) percent (%) of particle sizes in the range of three (3) to ten (10) microns in a treated fluid stream moving at approximately three hundred (300) feet per minute (ft/min) for a residential application and at approximately five hundred (500) feet per minute (ft/min) for commercial and industrial applications.

42. The high efficiency fluid filter of claim 36, said support scrim layer being a synthetic fibrous material of approximately forty (40) to one hundred fifty (150) grams per square meter (g./sq. m.) in basic weight with a fiber size of approximately seven (7) to one hundred (100) micrometers diameter and a Gurley stiffness of approximately thirty (30) to five hundred (500) grams (g).

43. The high efficiency fluid filter of claim 42, said downstream support scrim layer being a spun-bond material of approximately sixty (60) grams per square meter (g./sq. m.) in basic weight with a fiber size of approximately twenty (20) micrometers diameter and a Gurley stiffness of approximately eighty (80) grams.

44. The high efficiency fluid filter of claim 42, said downstream support scrim layer being a dri-laid material of approximately sixty (60) grams per square meter (g./sq. m.) in basic weight with a fiber size of approximately forty five (45) micrometers diameter and a Gurley stiffness of approximately eighty (80) grams.

45. The high efficiency fluid filter of claim 31, said filter media application being a fine synthetic material.

46. The high efficiency fluid filter of claim 45, said filter media application being a melt blown polypropylene.

47. The high efficiency fluid filter of claim 36, said lightweight upstream scrim material being a synthetic spun bond scrim in the range by weight of approximately five (5) to forty (40) grams per square meter (g./sq. m.).

48. The high efficiency fluid filter of claim 47, said light weight upstream scrim material being a polypropylene spun bond scrim of approximately fourteen (14) grams per square meter (g./sq. m.).

49. The high efficiency fluid filter of claim 31, said downstream support scrim layer including a synthetic hot melt adhesive spray.

50. The high efficiency fluid filter of claim 31, said downstream support scrim layer being ultrasonically bonded.

51. The high efficiency fluid filter of claim 49, said synthetic hot melt adhesive being a low melt polyethylene.

52. The high efficiency fluid filter of claim 49, said synthetic hot melt adhesive coating being polyethylenevinylacetate.

53. The high efficiency fluid filter of claim 31, said fibrous filter media application including a synthetic hot melt adhesive spray.

54. The high efficiency fluid filter of claim 53, said synthetic hot melt spray being a low melt polyethylene.

55. The high efficiency fluid filter of claim 53, said synthetic hot melt spray being polyethylenevinylacetate.

56. The high efficiency fluid filter of claim 31, and an additional fibrous filter media application on said combined scrim and filter media application.

57. The high efficiency fluid filter of claim 56, said additional filter media application being preceded and followed by a spray of synthetic hot melt material and an upstream light weight scrim.

58. The high efficiency fluid filter of claim 57, said additional fibrous filter media application also being of relatively estimated selected weight, fiber size and thickness wherein the combined layers of filter media and scrims obtain a desired minimum efficiency reporting value (MERV) at a desired pressure drop.

59. The high efficiency fluid filter of claim 31, said narrow strips of spacer material being of a synthetic plastic hot melt with spacing in the range of one to for inches between strips.

60. The high efficiency fluid filter of claim 31, said peak sharpness being in the range of zero point zero one (0.01) to zero point two (0.2) inches.

61. The high efficiency fluid filter of claim 31, said pleated fluid filter media being in cylindrical form.

62. The high efficiency fluid filter of claim 31, said pleated fluid filter media with said support scrim being of a cellulosic material.

63. The high efficiency fluid filter of claim 62, the basic weight of said cellulosic material being approximately one hundred (100) grams per square meter (g./sq. m.).

64. A high efficiency, low pressure drop pleated air filter including an upstream and downstream face and being capable of obtaining a desirable minimum efficiency reporting value (MERV) comprising: a downstream support scrim layer of either spun bond material or dri-laid material, wherein said spun bound material is approximately sixty (60) grams per square meter (g./sq. m.) in basic weight with a fiber size of approximately twenty (20) micrometers diameter and has a Gurley stiffness of approximately eighty (80) grams, wherein said dri-laid material is approximately sixty (60) grams per square meter (g./sq. m.) in basis weight with a fiber size of approximately forty five (45) micrometers diameter and has a Gurley stiffness of approximately eighty (80) grams; a hot melt spray of an amorphous material; a fine melt blown polypropylene filter media application on said support scrim layer; an upstream comparatively light weight scrim of spun bond polypropylene in the range by weight of approximately five (5) to forty (40) grams per square meter (g./sq. m.), said combined downstream and upstream scrims and filter media application layer being selectively spaced in facing pleated relationship with hot melt sprays of polyethylenevinylacetate therebetween and with pleats of a depth of zero point seventy-five (0.75) inches and in the range of approximately four (4) to eight (8) pleats per inch with the desired minimum efficiency reporting value (MERV) of said combined scrims and filter media application being of minimum MERV twelve (12) under ASHRAE Standard 52.2—1999 at a minimum pressure drop of zero point two (0.2) inches of water gage at an air flow of approximately three hundred (300) feet per minute (ft/min.) so as to be capable of capturing from a treated air stream at least eighty (80) percent (%) or more of particle sizes in the range of one (1) to three (3) microns and at least ninety (90) percent (%) of particle sizes in the range of three (3) to ten (10) microns, said combined layer being pleated in a series of longitudinally extending pleats with said pleats being separated by narrow strips of spacer material of a synthetic hot melt with spacing advantageously being approximately one (1) to four (4) inches and with said pleats having crests with peak sharpness advantageously less than zero point zero five (0.05) inches.

65. In a longitudinally extending pleated filter for treating fluid streams including a plurality of crests and valleys, a space arrangement for spacing adjacent pleats including at least one adhesive spacer having a cross-sectional bow shape with a narrow middle area and larger cross-sectional flanks extending therefrom, said narrow middle area arranged to engage a pleat crest optimizing pleat spacing between adjacent pleats with minimum resistance to a fluid stream to be treated.

66. The longitudinally extending pleated filter of claim 65, said larger cross-sectional flanks of said adhesive spacer being shorter than the breadth of said crest engaged pleat.

67. The longitudinally extending pleated filter of claim 65, said adhesive spacer being of a thermobondable plastic material.

68. The longitudinally extending pleated filter of claim 65, said spacer engaged pleat crest having a peak sharpness in the range of zero point zero one (0.01) to zero point two (0.2) inches.

69. A method of manufacturing filter comprising:
supplying at least one first layer of downstream support scrim;
spinning onto said scrim layer at least one application of filter media;
adhering said filter media onto said support scrim by either spraying said support scrim with an adhesive, ultrasonically bonding said filter media to said support scrim, or applying self adhering fibrous material to said support scrim;

scoring said combined layer of scrim and filter media to make selected spaced sharp score lines;

applying spacer material to said scored combined layer; and pleating said combined layer with spacer material thereon into a selected plurality of pleats separated by said spacer material with upstream crests of said pleats being of optimal narrow breadth whereby the combined pleated filter arrangement obtains a desired minimum efficiency reporting value (MERV) with a minimal pressure drop.

70. A high efficiency, low pressure drop pleated fluid filter having upstream and downstream faces and being capable of obtaining a desirable minimum efficiency reporting value (MERV) at the desired pressure drop comprising:

at least one layer of downstream support scrim of a first fibrous material;

at least one application of a fibrous filter media material in a facing relation on said support scrim layer, wherein said at least one application of a fibrous filter media material is accomplished by either spraying said support scrim with an adhesive, ultrasonically bonding said filter media to said support scrim, or applying self adhering fibrous material to said support scrim; and a plurality of longitudinally extending adjacent crested pleats in said combined scrim layer and filter media, wherein said longitudinally extending pleats are separated by a series of selectively spaced narrow strips of spacer material.

* * * * *